United States Patent
McMahon

(10) Patent No.: US 7,627,615 B2
(45) Date of Patent: Dec. 1, 2009

(54) COPY-ON-WRITE VERSIONING OF DOCUMENTS

(75) Inventor: Douglas James McMahon, Redwood City, CA (US)

(73) Assignee: Oracle International Corporation, Redwood Shores, CA (US)

(*) Notice: Subject to any disclaimer, the term of this patent is extended or adjusted under 35 U.S.C. 154(b) by 291 days.

(21) Appl. No.: 11/590,430

(22) Filed: Oct. 30, 2006

(65) Prior Publication Data

US 2008/0104141 A1    May 1, 2008

(51) Int. Cl.
*G06F 17/30* (2006.01)

(52) U.S. Cl. ............................. 707/203; 707/1; 707/10; 707/103 R; 707/202; 715/205; 715/229; 717/122; 717/170

(58) Field of Classification Search ................. 707/203, 707/1, 10, 103 R, 202; 715/229, 205; 717/170, 717/122
See application file for complete search history.

(56) References Cited

U.S. PATENT DOCUMENTS

| | | | |
|---|---|---|---|
| 5,649,200 A * | 7/1997 | Leblang et al. ............. | 717/122 |
| 5,778,371 A * | 7/1998 | Fujihara ..................... | 707/100 |
| 5,897,636 A * | 4/1999 | Kaeser ....................... | 707/100 |
| 6,018,741 A * | 1/2000 | Howland et al. ............ | 707/102 |
| 6,112,024 A * | 8/2000 | Almond et al. ............. | 717/122 |
| 7,113,962 B1 * | 9/2006 | Kee et al. .................... | 707/201 |
| 2002/0002567 A1 * | 1/2002 | Kanie et al. ................. | 707/513 |
| 2004/0059802 A1 * | 3/2004 | Jacquemot et al. .......... | 709/220 |
| 2004/0158575 A1 * | 8/2004 | Jacquemot et al. .......... | 707/102 |
| 2006/0020641 A1 * | 1/2006 | Walsh et al. ................ | 707/203 |

OTHER PUBLICATIONS

Kumar, Sushil, et al, "Oracle9i Flashback Query", An Oracle White Paper, Mar. 2002, 6 pages.

* cited by examiner

*Primary Examiner*—Jean B. Fleurantin
*Assistant Examiner*—Phong Nguyen
(74) *Attorney, Agent, or Firm*—Hickman Palermo Truong & Becker LLP

(57) ABSTRACT

Approach for versioning of documents is described. A version accumulator structure stores one or more version values indicating different versions of a data object. The data object is decomposable into a plurality of nodes. One or more copies of each node of the plurality of nodes are stored, where the one or more copies are associated with non-overlapping version ranges. A first request to perform a change to the data object is received. The first request specifies an effective version value for the change, which involves a particular node. The change is performed based on the effective version value and without making a deep copy of the data object. A second request to retrieve a certain version of the data object is received. The certain version is retrieved based on the version ranges associated with the one or more copies of each node of the plurality of nodes.

32 Claims, 8 Drawing Sheets

Fig. 7

| ID | ANCESTOR_ID | Content | Min_Version | Max_Version |
|---|---|---|---|---|
| 102 | | [content_R0] | 1.1 | 99.9 |
| 106 | 102 | [content_21] | 1.1 | 2.0 |
| 108 | 106 | [content_31] | 1.1 | 2.0 |
| 106 | 102 | [content_22] | 2.0 | 99.9 |
| 108 | 106 | [content_31] | 2.0 | 99.9 |
| 110 | 106 | [content_41] | 1.1 | 99.9 |
| 108 | 102 | [content_31] | 2.0 | 2.0 |
| 108 | 102 | [content_41] | 2.0 | 99.9 |
| 110 | 102 | [content_11] | 1.1 | 2.0 |
| 104 | 102 | [content_12] | 2.0 | 2.6 |
| 104 | 102 | [content_13] | 2.6 | 99.9 |

COPY-ON-WRITE VERSIONING OF DOCUMENTS

FIELD OF THE INVENTION

The present disclosure generally relates to data processing. The disclosure relates more specifically to techniques for copy-on-write versioning of documents.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Many documents may be represented as data objects that include one or more nodes. Further, the nodes of a data object may be organized according some logical representation (e.g. an ordered or a linked list, a tree, or a graph). For example, a properly formatted extensible Markup Language (XML) document may be represented by a data object in which the nodes (e.g. the XML elements of the XML document) are organized in a hierarchical tree.

Throughout the lifetime of a data object, different versions of the object may be created and stored for various purposes. One implementation of whole-object versioning semantics is to make a complete copy of the entire data object with each new version, then apply the new changes to the copy. (A complete copy of an entire data object, including all nodes thereof, is referred to herein as a "deep copy" of the data object.) This "deep copy" implementation of object versioning supports the creation of "in-between" versions—that is, a user can go back to an older version of the data object, make some edits, and save those changes in the older version without affecting later versions of the object. This implementation of object versioning is an efficient way to support versioned reads of the data object, because even if the object is stored in a decomposed and indexed fashion, the query or queries necessary to retrieve the object can simply include a filter similar to VERSION=[desired version]

to retrieve the desired version of the data object.

The disadvantage of the deep copy implementation of object versioning is that if the data object is large in relation to the size of the typical changes, a large amount of storage and index space must be devoted to redundant copies of the same information. Edits become slower because of the need to make a deep copy of the data object each time a change to the object is made. For example, consider a data object (e.g. an XML document) that stores an employee hierarchy, which may be both large and undergoing small revisions on a daily basis. Clearly, the deep copy implementation of object versioning is poorly suited to this situation because it would cause the creation and storage of numerous copies that include redundant information. There are two approaches that may be employed to address the disadvantages of the deep copy implementation of object versioning, both of which sacrifice some ability to edit older versions of the data object.

The first approach is to store the incremental changes (or "deltas") that are made to a data object. A collection of such changes constitutes a new version of the data object. A specific version of the data object may be reconstructed by successively applying the changes to the object. While this approach may save storage space, typically it is very costly to reconstruct versions of the data object because the successive application of each version's changes is computationally and resource intensive. (This drawback may be mitigated by occasionally inserting a deep copy of the data object into the sequence of stored changes, which provides a somewhat acceptable performance for retrieving older versions of the object; however, if an edit to an older version is needed, a complex reworking of the sequences of stored changes and deep copies would be required.) Thus, this approach is poorly suited for supporting the storage of a data object in componentized fashion and for the modification and retrieval of object nodes on a per-node basis (e.g. for supporting the storage, modification, and retrieval of only a portion of an employee tree represented in an XML document).

The second approach is to separately version each node of the data object (e.g. to separately version each of the elements of an XML document that stores an employee tree, and to reassemble the document based on version filters.) This approach avoids the need to reconstruct the data object by processing a series of deltas. In this approach, the query or queries to retrieve a desired version of the data object would need to include a filter similar to VERSION<=[desired version]

for each node of the object. However, while this filter may eliminate older versions of object nodes, it still yields both the desired version of the data object and any newer versions of the object. It must therefore be accompanied by a costly post-processing phase to eliminate the newer versions of the object nodes before the retrieval of the desired version of the data object is completed. Further, this approach still has an editing drawback similar to that of the delta versioning approach. That is, while it is possible to retrieve an older version of the data object, the older versions of the object cannot be easily edited with whole-object semantics. The reason is that each version of an object node may be "supporting" (e.g. included into) multiple logical versions of the entire object. For example, a particular node may have not changed across multiple versions of the object, where the multiple versions of the object are caused by changes to other object nodes. In this example, changing the old version of the particular node would have the unintended effect of changing the newer multiple versions of the data object as well.

Based on the foregoing, there is a clear need for techniques which support true whole-object semantics for editing and retrieval of versioned data object, but which overcome the disadvantages of the approaches described above.

BRIEF DESCRIPTION OF THE DRAWINGS

The techniques for copy-on-write versioning of documents are illustrated by way of example, and not by way of limitation, in the figures of the accompanying drawings and in which like reference numerals refer to similar elements and in which:

FIG. 7 is a block diagram that illustrates a flattened version of a data object according to one embodiment.

DETAILED DESCRIPTION

Figure 1:
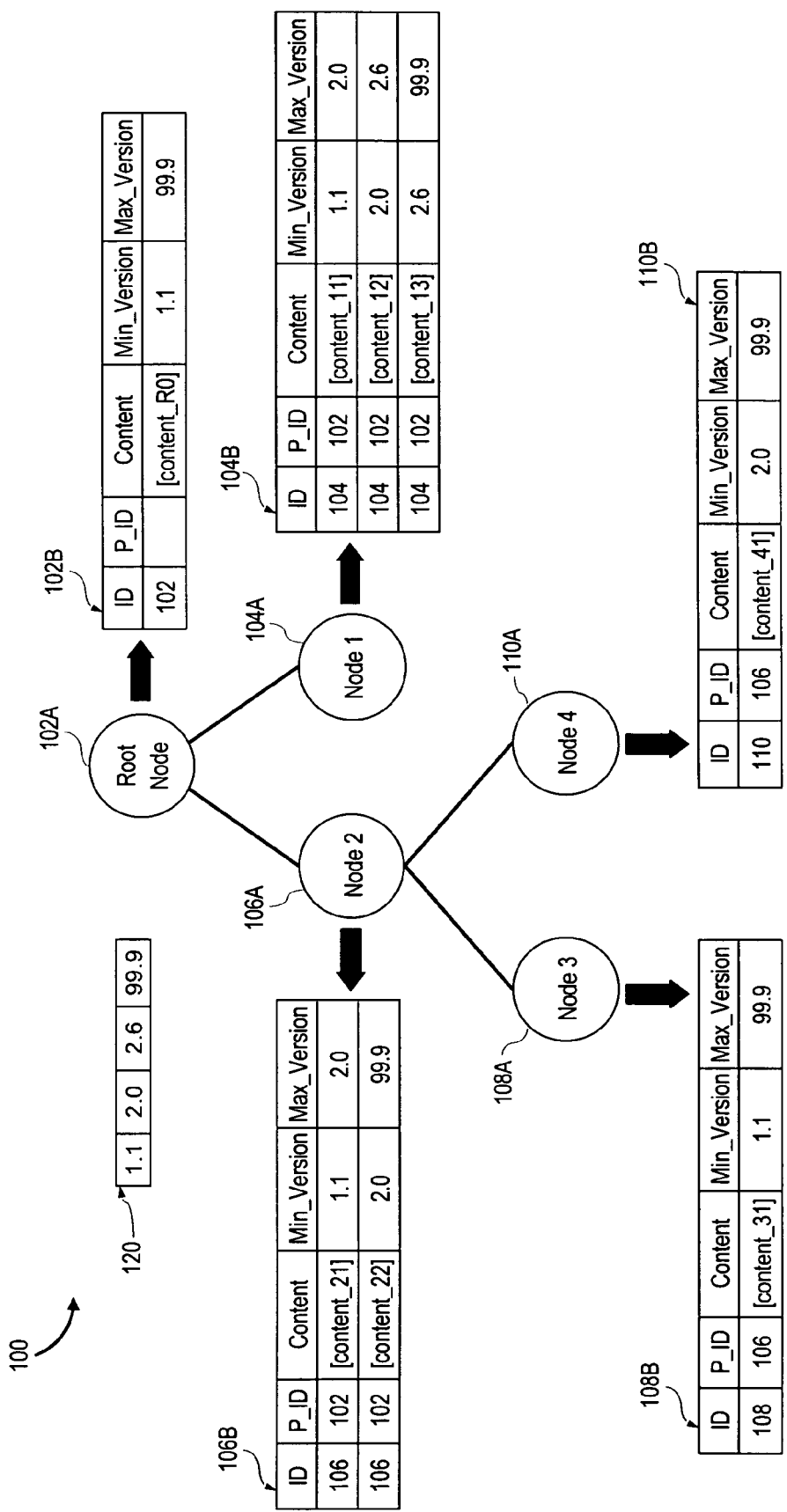
FIG. 1 is a block diagram that illustrates a data object and the storage structures for storing versions thereof according to one embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Sturctural and Functional Overview

Techniques are described for copy-on-write versioning of documents. The techniques described herein employ whole-object semantics for modifying data objects without making deep copies of the objects. "Data object" refers to any set of data that includes, and is decomposable into, a plurality of nodes. Examples of data objects include, but are not limited to, an XML document, a set of instances of one or more object classes that are stored as objects in a object-relational database, and a set of records that are stored in one or more relational tables in a relational database. "Node" refers to a component of a data object that is identified as logically separate from other components of the data object; a node may be added, deleted, modified, and moved within the data object independently of other nodes in the object. Examples of nodes include, but are not limited to, an XML element, and instance of an object class that is stored as an object in an object database, and a record stored in a relational table in a relational database.

The techniques described herein are not limited to data objects in which the nodes are organized according to any particular logical representation. In some embodiments, the nodes in a data object may be organized as a hierarchical tree. (A typical example of such data object is an XML document that comprises a plurality of XML elements.) In other embodiments, the nodes in a data object may be organized according to other types of logical representations, for example, graphs or linked lists. In yet other embodiments, a data object may include a collection of nodes that are not organized or related in any particular way. Thus, the examples of data objects described herein are to be regarded in an illustrative rather than a restrictive sense.

According to the techniques described herein, one or more versions may be stored for each node of a data object. As used herein, "version" refers to an identifiable copy of an entire data object or of a node thereof. A different version may be obtained by performing a change to an existing copy of the data object and/or one or more nodes thereof. To distinguish between the different versions, a version is associated with a version value. "Version value" refers to an indicator of a version, where the indicator is drawn from a domain of values that can be numerically compared to each other. Examples of domains include, but are not limited to, datetime values, real numbers, and any ordered set of values. In some embodiments, the domain from which version values are drawn may be explicit, for example, where the domain is an ordered set of predetermined values. In other embodiments, the domain from which version values are drawn may be implicit and the version values need not be stored, for example, where the domain is implicitly defined as the set of non-negative integers $\{0, 1, 2, 3, \ldots\}$. Thus, the examples of version values used throughout this disclosure are to be regarded in an illustrative rather than a restrictive sense.

According to the techniques described herein, a version accumulator structure is maintained for a data object. "Version accumulator structure" refers to a storage structure that stores the version values indicating the versions of all copies of all nodes included in the data object. In some embodiments, the version accumulator structure may be stored within one of the nodes of the data object. (For example, the version accumulator structure may be stored within the root node of an XML document.) In other embodiments, the version accumulator structure may be stored as a storage structure that is not kept within the data object.

The techniques described herein provide for maintaining different versions by employing a range-versioning mechanism. One or more copies, each representing a different version, may be stored for each node of a data object. Each copy of the one or more copies of any particular node is associated with a version range. "Version range" refers to a pair of a minimum version value and a maximum version value that are associated with a copy of a node. The version range associated with any given copy of the one or more copies of a particular node is maintained to not overlap with any other version range that is associated with any other copy of the one or more copies of the particular node. Maintaining version ranges of node copies in this way provides that in any particular version of a data object there would exist at most one copy of each node included in the data object. Further, maintaining non-overlapping version ranges of node copies provides whole-object versioning semantics that allow the support and creation of "in-between" versions of the data object. For example, a user can perform changes to an older version of a node, make the changes retroactive (e.g. the user can associate the changes with a version number that is earlier than the current version number for the node), and save the changes as a prior, but not already existing, version of the data object without affecting later versions of the object.

The range-versioning mechanisms employed by the techniques described herein also allow for efficient storage and scanning of data objects. In some embodiments, indexes may be created based on the version ranges associated with the copies of the nodes of a data object, and an efficient index scanning process may be used during the retrieval of a particular version of the object. The indexes created based on the version ranges may be such that an index scanning process would exploit the fact that a range-bounded comparison to the indexes will yield at most one matching value. For example, in one embodiment version ranges associated with copies of object nodes are maintained in the following way: the minimum version value of any version range is inclusive and the maximum version is exclusive. That is, for any particular copy of a node, the minimum version value in the version range of the particular copy is the first version for which the particular copy is effective, and the maximum version value in the version range is the first version at which the particular copy of the node becomes ineffective.

The copy-on-write (also referred to as "lazy-copy") versioning techniques described herein, maintain the versions of a data object by making copies of the object nodes on an as-needed basis. For example, when a change involving a particular node of the data object is performed, a copy of the node reflecting the change is made. The change would typically be associated with a specific version value, and this and/or another copy of the node may be range-versioned—that is, the version range associated with this and/or the other copy of the node may be determined and stored based on the specific version value and the version values stored in the version accumulator structure. If the specific version value for the performed change is not stored in the version accumulator structure, the version accumulator structure may be updated to store that value accordingly. (It is noted that in an extreme case in which all nodes of a data object are edited in the same specific version, the techniques described herein may produce a deep copy of the data object that includes a copy of each node that is range-versioned based on the version number indicating the specific version).

The copy-on-write techniques described herein may use various range-based retrieval techniques to reconstruct on the fly, and retrieve, any version of the data object or a particular portion thereof. For example, in some embodiments, the retrieval techniques may provide for traversing the nodes in the data object and, at each node, for querying the copies of that node by applying a filter to the version ranges associated with the copies to determine that copy of the node which corresponds to the desired version. In embodiments in which the nodes of a data object are organized in a logical representation (e.g. a tree), the retrieval techniques may also provide for retrieving a "flattened" version of the data object—that is, for each copy of a parent node in the data object, the retrieval techniques would determine on the fly and output the copies of all child nodes that are descendants of that particular copy of the parent node.

Storage Representations of Versioned Data Objects

FIG. 1 is a block diagram that illustrates a data object and the storage structures for storing versions thereof according to one embodiment. Data object 100 is organized as a tree and comprises root node 102A and descendant nodes 104A, 106A, 108A, and 110A, where nodes 104A and 106A are child nodes of the root node, and nodes 108A and 110A are child nodes of node 106A. (It is noted that for illustrative purposes, data object 100 is depicted as having only five nodes; however, in different operational scenarios a data object may include any number of nodes.)

Associated with data object 100 is version accumulator structure 120. Version accumulator structure 120 stores version values that indicate the versions of all copies of all nodes included in the data object. (The version values stored in version accumulator structure 120 are "1.1", "2.0", "2.6", and "99.9".) In the particular embodiment illustrated in FIG. 1, the version values are drawn from the domain of real numbers. In other embodiments, the version values stored in the version accumulator structure may be datetime values in a "mm/dd/yyyy" format. The techniques described herein are not limited to any particular type or format of version values.

In the embodiment illustrated in FIG. 1, the version value "99.9" stored in version accumulator structure 120 is an "infinity" version value. (An "infinity" version value is an artificially imposed version value that is greater than any possible version value of a data object.) In this embodiment, the infinity version value is used to provide for more efficient edits and for a more efficient execution of retrieval queries. For example, it may be costly to have to update all unedited nodes of a data object with a new maximum version value each time a new version of the whole object is created. Yet, the efficiency of a retrieval query may be reduced if the maximum version value is left "blank" (or NULL) in the version ranges associated with copies of nodes that have not yet been superseded by any other versions. To avoid this situation, this embodiment uses the infinity version value of "99.9" that compares higher than any legal value for any version of the data object. (It is noted that any value or mark can be used as the infinity version value. The techniques described herein are not limited to using any type of value or mark as the infinity version value; in fact, the techniques described herein do not necessarily need to use an infinity version value.)

In the embodiment illustrated in FIG. 1, one or more copies are stored for each of the nodes of data object 100. Storage structure 102B stores one copy of root node 102A. In FIG. 1, storage structure 102B is represented as a table that includes columns "ID", "Content", "Min_Version" and "Max_Version". Column "ID" stores the identifier of root node 102A. Column "P_ID" stores the identifier of (or pointer to) the parent node of root node 102A. (Since root node 102A is not a child node of any other node of data object 100, this column would be blank or "NULL" for all copies of root node 102A). Column "Content" stores the content of root node 102A. (It is noted that in FIG. 1 column "Content" is used as a representative of the content of a node. In various embodiments, the content or other information of a node may be stored in multiple columns and/or in multiple tables, or in any other type of storage containers.) Column "Min_Version" stores the version value of the first version for which the particular copy of the root node (as represented in a row of the table) is effective. Column "Max_Version" stores the version value of the first version for which the particular copy of the root node (as represented in a row of the table) becomes ineffective. As illustrated in FIG. 1, storage structure 102B stores only one copy of the root node 102A, which copy has the content of "[content_R0]" and is effective for any versions of data object 100 that are greater than or equal to version "1.1" and that are less than version "99.9".

Similarly to root node 102A, one or more copies of each of descendant nodes 104A, 106A, 108A, and 110A are stored in a corresponding storage structure. Specifically, storage structure 104B stores three copies of node 104A, storage structure 106B stores two copies of node 106A, storage structure 108B stores one copy of node 108A, and storage structure 110B stores one copy of node 110A. For illustration purposes only, storage structures 104B, 106B, 108B, and 110B are depicted in FIG. 1 as having columns that are identical (in name and purpose) as the columns in storage structure 102B. However, in different embodiments and in different implementations, the storage structures in which copies of object nodes are stored may differ from node to node depending on the type and amount of information that is included as the content of each node. Further, the physical storage in which the storage structures are created may also differ from node to node. For example, in the embodiment illustrated in FIG. 1, storage structures 102B, 104B, 106B, 108B, and 110B may be created in the same physical table or in five separate tables that have the same table definition.

The techniques described herein are not limited to employing any particular type or number of storage structures for storing copies of data object nodes. In some embodiments, the storage structures for storing copies of object nodes may be one or more relational tables in one or more relational databases. In other embodiments, the storage structures may be objects stored in object-relational databases. In yet other embodiments, the storage structures may be one or more structured flat files (e.g. delimited files), spreadsheet files, and any other operating system files in which structured information may be stored. Further, in some embodiments heterogeneous storage structures may be used to store the copies of different nodes of the same data object. Thus, the techniques described herein are not limited to any particular type or number of storage structures for storing copies of data objects, and for this reason the examples of storage structures described herein are to be regarded in an illustrative rather than a restrictive sense.

In some embodiments, one or more indexes may be created over the storage structures in order to facilitate a more efficient execution of retrieval queries. For example, in one embodiment at least one index may be created over at least one of the minimum and maximum version values associated with copies of object nodes. Creating indexes over minimum and maximum version values may facilitate a more efficient execution of retrieval queries that use filters based on version ranges. Further, in addition to the minimum and maximum version values, in different embodiments the indexes may also be created over other relevant values, such as, for example, node identifier values and parent node identifier values. The created indexes may be B-tree indexes and/or any other type of indexes depending on the indexing capabilities of the underlying database system in which the storage structures are created.

Maintaining and Retrieving of a Data Object

Figure 2:
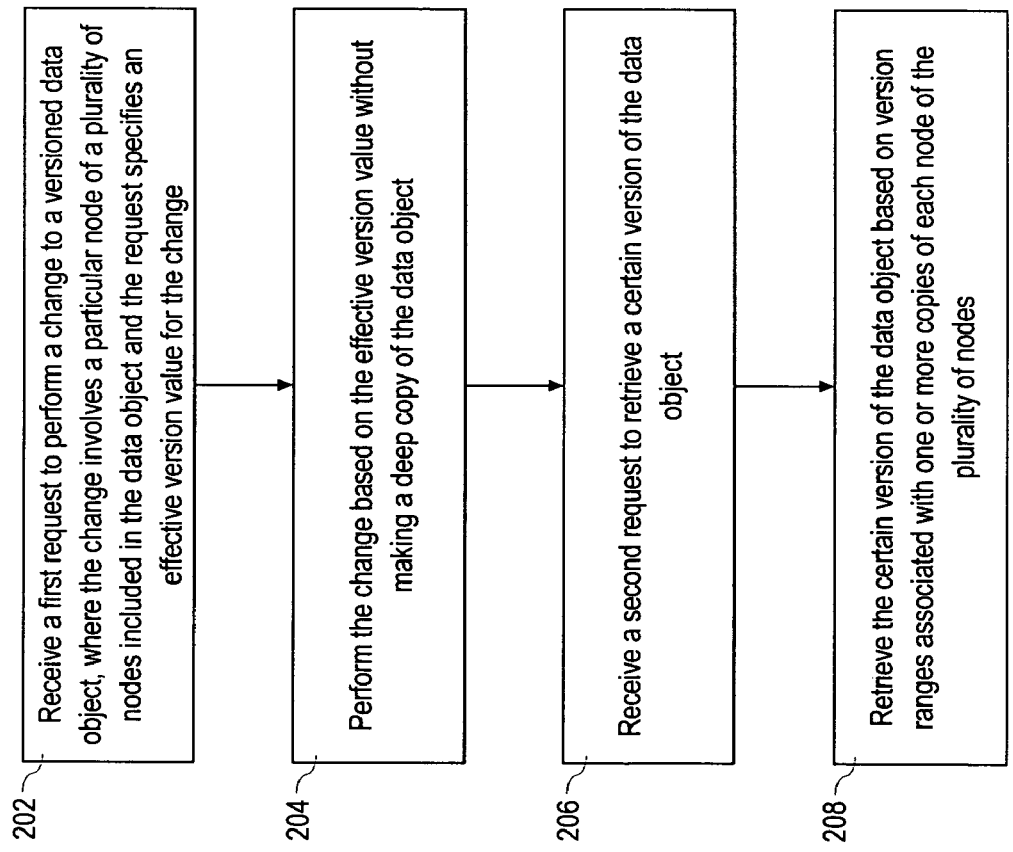
FIG. 2 is a flow diagram that illustrates an overview of a method for copy-on-write versioning of data objects according to one embodiment.

FIG. 2 is a flow diagram that illustrates an overview of a method for copy-on-write versioning of data objects according to one embodiment.

In step 202, a first request to perform a change to a versioned data object is received. The change specified in the first request involves a particular node of the plurality of nodes that are included in the data object. The first request also specifies an effective version value for the change, where the effective version value indicates a specific version of the data object in which the change is to be reflected.

For example, in one embodiment the change specified in the first request may include any one or more of: adding a new node to the data object, removing an existing node from the data object, and modifying a particular node of the data object. If in this embodiment the data object is organized as some logical representation (e.g. a tree or a graph), the change specified in the first request may also include moving a particular node to a different location in that logical representation.

In some operational situations, the effective version value specified in the request may indicate that the change is to be performed to an already existing (either current or older) version of the data object.

In some operational situations, the effective version value specified in the first request may indicate a certain version of the data object that does not yet exist. The certain version that does not yet exist may be a new latest (or new current) version of the data object, or it may be some non-existing version that is earlier that the current version. For example, the first request may retroactively specify (through the effective version value) that a non-current older version of the data object should have included the change specified in the first request.

According to the techniques described herein, the particular version to which the change specified in the first request is to be performed is determined based on the version values stored in the version accumulator structure associated with the data object. By comparing the effective version value specified in the first request to the version values stored in the version accumulator structure, it may be determined whether the version indicated by the effective version value (i.e. the version of the data object to which the change is to be performed) is an existing version of the data object, a new version of the data object greater than any existing version, and/or a not yet existing version of the data object that would fall between existing versions. In this way, the techniques described herein provide for whole-object versioning semantics according to which changes may be made to any version of a data object, including changes that are retroactively made to older and/or non-existing versions as well as changes that are made to current and/or new current versions of the data object.

In step 204, the change specified in the first request is performed to a specific version of the data object that is indicated by the effective version value. Depending on the type of the requested change, performing the change to the specific version may include performing the change to a specific copy of a particular node included in the data object. However, performing the change does not include making a complete (deep) copy of all nodes of the data object.

In step 206, a second request to retrieve a certain version of the data object is received. The second request may specify a certain version value that indicates the certain version of the data object which is to be retrieved.

In some operational situations, the certain version value specified in the second request may match to a version value that is stored in the version accumulator structure, e.g. the certain version value may align exactly to a particular stored version of the data object.

In some operational situations, the certain version value specified in the second request may not match to any version value that is stored in the version accumulator structure. For example, in some embodiments the version values may be datetime values. In these embodiments, a user may request to see the data object as the data object existed as of a particular date, which may happen to not be a date on which the data object was changed. Thus, with respect to retrieval, the techniques described herein are not limited to retrieving only versions of a data object that are expressly indicated by a version value stored in the version accumulator structure. The techniques described herein provide for retrieval of a data object as of any particular version that may be validly specified for the data object.

In some embodiments, the second request may specify that only a portion of the data object, but not the entire data object needs to be retrieved. In these embodiments, second request may also specify that the retrieved portion of the data object needs to be associated with the certain version of the data object specified in the request.

In some embodiments, the nodes of a data object may be organized in a logical representation (e.g. a tree). In these embodiments, the certain version specified for retrieval in the second request may be a flattened version of the entire data object or of a particular portion thereof.

In step 208, the certain version of data object specified in the second request is retrieved. The techniques described herein provide for reconstructing the certain version of the data object on the fly. For example, in some embodiments, the retrieval techniques may provide for traversing the nodes in the data object and, at each node, for querying the copies of that node by applying a filter to the version ranges associated with the copies to determine that one copy of the node which corresponds to the requested certain version.

Adding a New Node to a Versioned Data Object

In one embodiment, the nodes of a data object may be organized as a hierarchical tree. In this embodiment, when a request to add a new node to a data object is received, the version accumulator structure is inspected to determine whether the effective version value specified in the request falls on or aligns exactly on an existing version of the data object, falls before the earliest version of the data object, falls after the last version of the data object, or falls between existing versions of the data object.

A terminal version value for the new node is determined from the version accumulator structure. The "terminal" version value is the smallest version value stored in the version accumulator structure that is greater than the effective version value specified for the new node. Thus, the effective version value specified in the request indicates the version for which the new node becomes effective, and the terminal version value indicates the first version for which the node becomes ineffective.

In this embodiment, if the new (to be added) node falls exactly on an existing version of the data object (e.g. when the effective version value matches a version value stored in the version accumulator structure), the node may be created as a child node of any other node for which a copy exists in that version. If allowed by the particular implementation, the new node may also be made the root of the tree and the old root node of the tree may be re-parented (by, for example, moving the old root node as a child node of the new node). A copy that includes the content of the new node is created and associated with a new version range. The minimum version value (also referred to hereinafter as "MINIMUM_VERSION") of the version range is set to the effective version value, and the maximum version value (also referred to hereinafter as "MAXIMUM_VERSION") of the version range is set to the terminal version value determined for the new node. (The terminal version value may be the infinity version value associated with the data object.)

If the new node falls before the earliest version of the data object (e.g. when the effective version value is smaller than the smallest version value stored in the version accumulator structure), the new node may be created as the root node of the data object. A copy that includes the content of the new node is created and associated with a new version range. The MINIMUM_VERSION of the version range is set to the effective version value, and the MAXIMUM_VERSION of the version range is set to the terminal version value (which in this case would be the previous smallest version value stored in the version accumulator structure). The version accumulator structure is then updated to store the effective version value, which indicates a new version of the data object that includes the new node.

If the new node falls after the last version of the data object (e.g. when the effective version value is greater than the greatest version value stored in the version accumulator structure except for any infinity version value), the new node may be created as the child node of any other node that still exists in the last version (or as the root node). A copy that includes the content of the new node is created and associated with a new version range. The MINIMUM_VERSION of the version range is set to the effective version value and the MAXIMUM_VERSION of the version range is set to the infinity version value defined for the data object. The version accumulator structure is then updated to store the effective version value, which indicates a new version of the data object that includes the new node.

If the new node falls between two existing versions (e.g. when the effective version value is between two version values already stored in the version accumulator structure), the new node may be created as the child node of any other node that exists in the earlier existing version. A copy that includes the content of the new node is created and associated with a new version range. The MINIMUM_VERSION of the version range is set to the effective version value, and the MAXIMUM_VERSION of the version range is set to the terminal version value. The version accumulator structure is then updated to store the effective version value, which indicates a new version of the data object that includes the new node. This has the effect of inserting the new version between two already existing versions of the data object.

Figure 3:
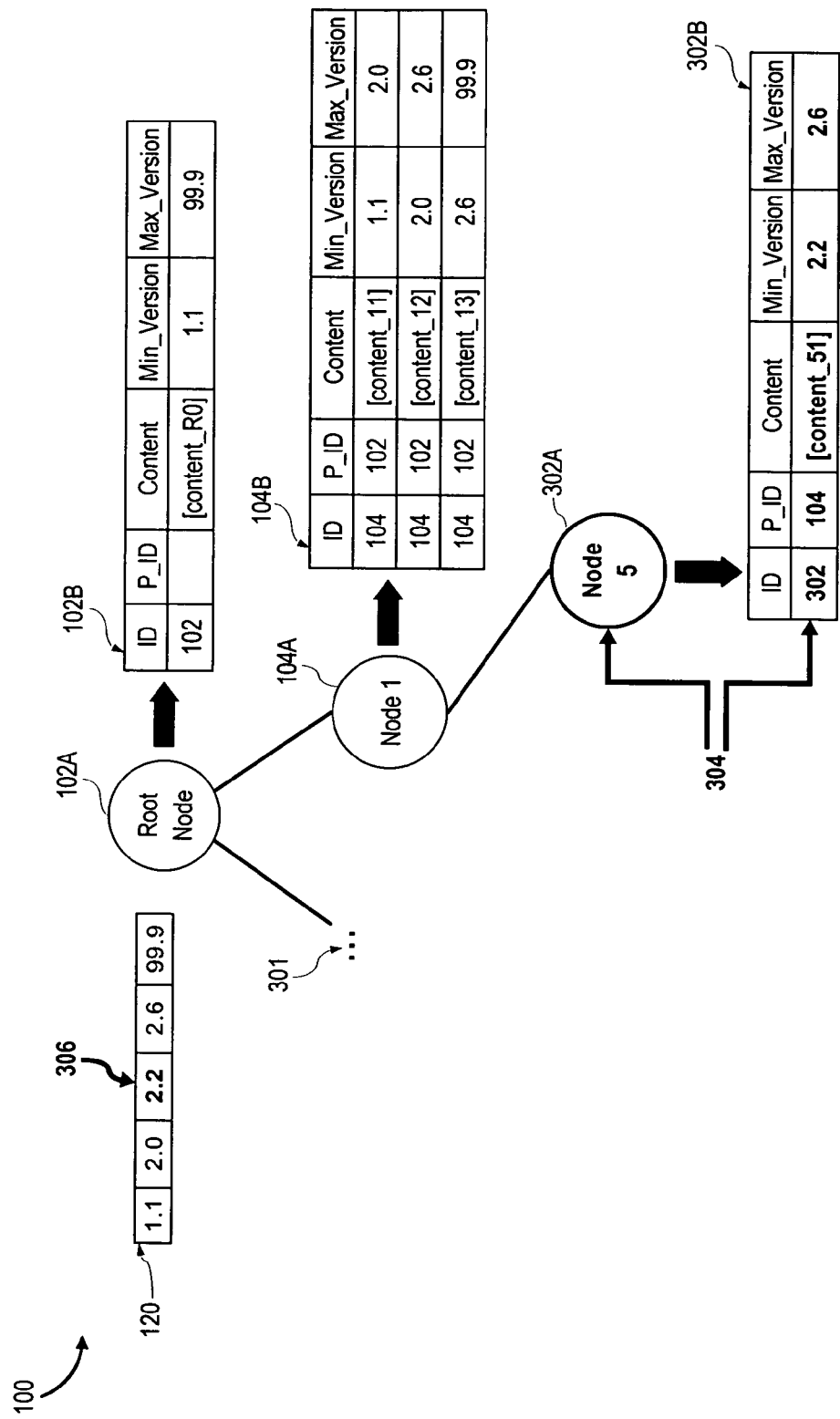
FIG. 3 is a block diagram that illustrates adding a new node to a data object according to one embodiment.

FIG. 3 is a block diagram that illustrates adding a new node to a data object according to one embodiment. FIG. 3 illustrates an operational scenario in which a new node is added to the data object 100 of FIG. 1, where the new node falls between two existing versions of the data object. (Ellipsis 301 indicates portions of data object 100 that are not shown in FIG. 3.)

In the operational scenario of FIG. 3, a request is received to add new node 302A ("Node 5") to data object 100 with an effective version of "2.2". The effective version value "2.2" included in the request is compared to the version values stored in version accumulator structure 120, and a determination is made that the terminal version value associated with new node 302A is version value "2.6". The new node 302A is then inserted as a child node of node 104A. (The fact that the new node needs to be made a child node of node 104A may also be specified in the request.) As indicated by reference numeral 304, new node 302A is inserted in data object 100, and storage structure 302B is created to store a new (e.g. the first) copy of node 302A. The new copy of node 302A is then stored as a record in structure 302B. In the record, column "ID" stores the node identifier of node 302A (in this case node identifier "302" identifies the new node 302A), column "P_ID" stores the node identifier of the parent node (in this case node identifier "104" identifies the parent node 104A), column "Content" stores the content of the new copy (which is, as illustrated, "[content_51]"), column "Min_Version" stores the minimum version value associated with the version range of the new copy (which is, in this case, the effective version value "2.2"), and column "Max_Version" stores the maximum version value associated with the version range of the new copy (which is, in this case, the terminal version value "2.6"). As indicated by reference numeral 306, version accumulator structure 120 is then updated to store the effective version value "2.2", which indicates the new "2.2" version of data object 100 that includes the new node 302A.

In other embodiments, the versioned data object to which a new node is added may be stored according to a logical representation that is different from a tree. Depending on the logical representation of the data object, some additional processing may be necessary on parent nodes (for example, adjusting pointers or other information that is used to maintain the storage representation of the data object).

In some embodiments, the versioned data object to which a new node is added may be a collection of nodes which are not interrelated according to any particular logical representation. In these embodiments, after the terminal version value for the new node is determined from the version accumulator structure associated with the data object, a copy that includes the content of the new node is created and associated with a new version range. The MINIMUM_VERSION of the version range is set to the effective version value, and the MAXIMUM_VERSION of the version range is set to the terminal version value. If the version accumulator structure does not already store the effective version value, the version accumulator structure is updated to store the effective version value, which indicates a new version of the data object that includes the new node.

Removing a Node from a Versioned Data Object

The removal of a node may be done either as of an existing version of a data object or after an existing version but before zero or more other versions. The removal of a node cannot be done prior to any existing versions of the data object. Depending on the specific version that needs to be removed, the removal of a particular node may involve modifying, deleting, and/or splitting one or more copies of the particular node that is being removed. "Splitting" (or "node version splitting") of a particular node refers to the process of creating one or more new copies of the particular node based on a pre-existing copy of the particular node. In some embodiments, node version splitting is performed based on two values: the effective version value specified in a removal request and the terminal version value that is determined from the version accumulator structure based on the effective version value. The effective version value and the terminal version value determine a specific copy of a particular node that needs to be removed from the data object, and it is this specific copy of the particular node that may be split to create one or more new copies of the node.

In one embodiment, a request to remove a node of a data object is received. The removal request specifies an effective version value that indicates the specific version of the node that needs to be removed from the data object. A terminal version value for the to-be-removed node is determined from the version accumulator structure. The terminal version value is the smallest version value stored in the version accumulator structure that is greater than the effective version value specified in the removal request. The effective version value specified in the request indicates the version for which the removal becomes effective (e.g. the version of the data object from which the node needs to be removed), and the terminal version value indicates the first version for which the removal becomes ineffective. In cases where the effective version value is equal or greater than the greatest version value stored in the version accumulator structure, the infinity version value is used as the terminal version value. This ensures that the terminal version value is always greater than the effective version value.

After determining the terminal version value for the node that is to be removed, a particular copy of the node is determined from one or more copies of that node that may exist. The particular copy is that one copy of the node which supports the version of the node that needs to be removed from the data object. The particular copy is located by comparing the effective version value specified in the removal request to the version ranges associated with the one or more copies of the node that may exist. The particular copy is that one copy of the one or more copies which is associated with a version range for which the effective version value is greater than or equal to the minimum version value and less than the maximum version value included in that version range. In embodiments that provide for indexing, determining the particular copy may involve scanning an index that is created over minimum and maximum version values associated with copies of nodes.

If the MINIMUM_VERSION of the version range associated with the particular copy is equal to the effective version value, and the MAXIMUM_VERSION of the version range is greater than the terminal version value, then the particular copy of the node is not needed to support any older versions of the data object, but is needed to support later versions. In order to remove the particular copy, the MINIMUM_VERSION of the version range associated with the particular copy is set to the terminal version value. With this the removal is completed. This type of removal may create a "gap" in the version sequence of the node if there exists a copy of the node that is associated with a version range in which the MAXIMUM_VERSION is less than or equal to the effective version value.

If the MAXIMUM_VERSION of the version range associated with the particular copy is greater than the terminal version value, a new copy of the node is needed to support versions of the data object from the terminal version (indicated by the terminal version value) forward. The particular copy is stored as a new copy of the node that is associated with a new version range. The MINIMUM_VERSION of the new version range is set to the terminal version value and the MAXIMUM_VERSION of the new version range is kept the same as in the original particular copy. If the terminal version value is the infinity version value defined for the data object, then the new copy is not made.

If the MINIMUM_VERSION of the version range associated with the particular copy is equal to the effective version value and the MAXIMUM_VERSION of the version range is equal to the terminal version value, then the particular copy of the node is deleted since it is no longer needed to support any version of the data object. (It is noted that in this operational scenario, the MAXIMUM_VERSION of the version range associated with the particular copy may be equal to the terminal version value if the effective version value matches a version value that is stored in the version accumulator structure.)

If the MINIMUM_VERSION of the version range associated with the particular copy is less than the effective version value, then the particular copy of the node is still needed to support older versions of the data object. In this operational scenario, the MAXIMUM_VERSION of the version range associated with the particular copy is set to the effective version value. With this the removal is completed. This type of removal may create a "gap" in the version sequence of the node if there exists a copy of the node that is associated with a version range in which the MINIMUM_VERSION is greater than or equal to the terminal version value.

After the removal is completed, the version accumulator structure is checked to determine whether the effective version value is already stored therein. If it is not, the version accumulator structure is updated to store the effective version value.

Figure 4:
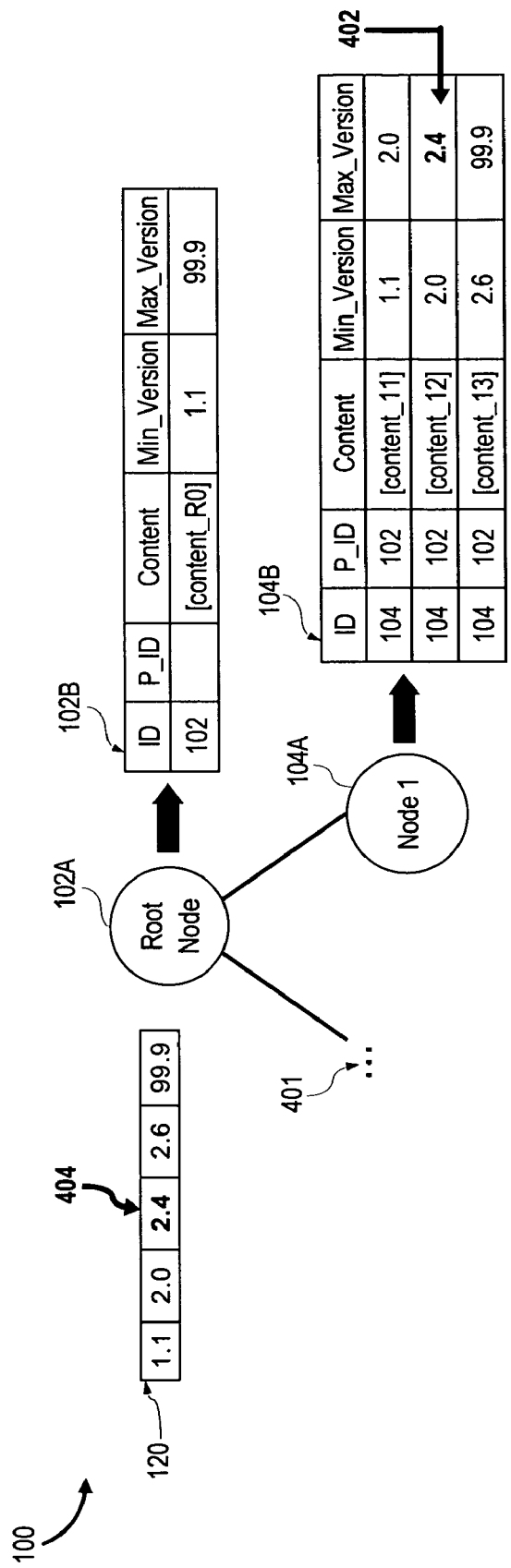
FIG. 4 is a block diagram that illustrates removing a version of a node from a data object according to one embodiment.

FIG. 4 is a block diagram that illustrates removing a version of a node from a data object according to one embodiment. FIG. 4 illustrates an operational scenario in which a node is removed from the data object 100 of FIG. 1, where the minimum version value of the copy of the node that needs to be removed is less than the effective version value specified in the removal request. (Ellipsis 401 indicates portions of data object 100 that are not shown in FIG. 4.)

In the operational scenario of FIG. 4, a request is received to remove node 104A from data object 100 effective as of version "2.4". The effective version value "2.4" included in the removal request is compared to the version values stored in version accumulator structure 120, and a determination is made that the terminal version value associated with the removal request is version value "2.6". The particular copy of node 104A that needs to be removed is determined next. The effective version value "2.4" is compared to the version ranges associated with the copies of node 104A that are stored as records in storage structure 104B. Based on the version values stored in the "Min_Version" and "Max_Version" columns, the particular copy that needs to be removed is determined as the record that stores the version value "2.0" in column "Min_Version". Since the minimum version value "2.0" of that particular copy of node 102A is less than the effective version value "2.4", the maximum version value ("2.6") associated with that copy is updated to the effective version value ("2.4") as indicated by reference numeral 402. Version accumulator structure 120 is then checked to determine whether the effective version value "2.4" is stored therein. Since version value "2.4" is not stored in version accumulator structure 120, the version accumulator structure is updated to store the effective version value "2.4" as indicated by reference numeral 404.

In some embodiments, the versioned data object from which a node is removed may be stored according to some logical representation, for example a tree or a graph. Depending on the logical representation of the data object, some additional processing may be necessary on some specific nodes, such as, for example, parent nodes and/or root nodes.

In embodiments in which a data object is organized according to some logical representation (e.g. a tree), one consequence of removing a node as described herein may be that "orphan" node versions are left in the data object. For example, a version of a descendant node, which was exactly bounded by the version range (e.g. the effective version value and the terminal version value) associated with a removal request for a parent node, may be left with no parent version. Copies of descendant nodes that overlap the removal version range of a parent node may appear to be orphans if a retrieval operation originates from them but with an effective version inside the removal version range. In some embodiments this consequence may be avoided by performing the retrieval operations downward from the root node of the data object thus making the presence of any orphaned copies of descendant nodes irrelevant. In other embodiments that provide for "read all" operations that query all nodes at once, this consequence may be avoided by performing post-processing on the returned output to remove any orphans.

In some embodiments, orphan versions of descendant nodes may be avoided by performing a downward cascade when a version of a parent node is removed. For example, a depth-first recursive traversal of the descendant nodes of a removed node may be performed to apply to each visited descendant node the same removal logic as described herein by using the same removal version range for each visited node. The traversal may end when the last node (the node specified for removal in the original request) is removed. The effect of this mechanism is to leave a "gap" in the version sequences of all descendant nodes under the removed node.

Modifying a Node in a Version Data Object

Performing a change to a node may be done either as of an existing version of a data object or after an existing version but before zero or more other versions. Performing a change to a node cannot be done prior to any existing versions of the data object. Depending on the specific version that needs to be modified, performing a change to a particular node may involve modifying and/or splitting one or more copies of the particular node that is to be modified. In some embodiments, node version splitting is performed based on two values: the effective version value specified in a modification request and the terminal version value that is determined from the version accumulator structure based on the effective version value. The effective version value and the terminal version value determine a specific copy of a particular node that needs to be modified, and it is this specific copy of the particular node that may be split to create one or more new copies of the node.

Node version splitting for modifying a node may result in either (a) changing a node in-place, (b) doing a 2-way split of the node, or (c) doing a 3-way split of the node. The in-place change is performed in situations where the particular copy of the node that is to modified exactly covers the same version range as defined by the effective version value and terminal version value. A 2-way split is performed if the particular copy of the node that is to modified aligns with either the effective version value or the terminal version value, but not both, thus necessitating a copy of the node to support either older or newer versions of the data object. Finally, a 3-way split is performed if the particular copy of the node that is to modified spans the version range defined by the effective version value and the terminal version value, without aligning to either of them.

In one embodiment, a request to modify a node of a data object is received. The modification request specifies an effective version value that indicates the specific version of the node that needs to be modified as well the change that needs to be performed on the node. A terminal version value for the to-be-modified node is determined from the version accumulator structure. The terminal version value is the smallest version value stored in the version accumulator structure that is greater than the effective version value specified in the modification request. The effective version value indicates the version for which the requested change becomes effective (e.g. the version of the data object that would include the requested change), and the terminal version value indicates the first version for which the requested change becomes ineffective. In cases where the effective version value is equal or greater than the greatest version value stored in the version accumulator structure, the infinity version value is used as the terminal version value. This ensures that the terminal version value is always greater than the effective version value.

After determining the terminal version value for the node that is to be modified, a particular copy of the node is determined from one or more copies of that node that may exist. The particular copy is that one copy of the node which supports the version of the node that needs to include the requested change. The particular copy is located by comparing the effective version value specified in the modification request to the version ranges associated with the one or more copies of the node that may exist. The particular copy is that one copy of the one or more copies which is associated with a version range for which the effective version value is greater than or equal to the minimum version value and less than the maximum version value included in that version range. In embodiments that provide for indexing, determining the particular copy may involve scanning an index that is created over minimum and maximum version values associated with copies of nodes.

If the MINIMUM_VERSION of the version range associated with the particular copy is equal to the effective version value, and the MAXIMUM_VERSION of the version range is equal to the terminal version value, then the particular copy that is to be modified is an exact version match (e.g., the result of an earlier edit to the same effective version of the node). The particular copy of the node is then updated in-place to include the requested change.

If the MAXIMUM_VERSION of the version range associated with the particular copy is greater than the terminal version value, then a new copy of the node is needed to support later versions of the data object. The particular copy is stored as a new copy of the node that is associated with a new version range, where the new copy includes the requested change. The MNIMUM_VERSION of the new version range is set to the terminal version value, and the MAXIMUM_VERSION of the new version range is set to the same maximum version value as in the original particular copy.

If the MINIMUM_VERSION of the version range associated with the particular copy is less than the effective version value, then a new copy of the node is needed to support earlier versions of the data object. The particular copy is stored as a new copy of the node that is associated with a new version range. The MAXIMUM_VERSION of the new version range is set to the effective version value, and the MINIMUM_VERSION of the new version range is set to the same minimum version value as in the original particular copy. The particular copy is then updated to include the requested change. The MINIMUM_VERSION of the version range associated with the particular copy set to the effective version value, and the MAXIMUM_VERSION of the particular copy's version range set to the terminal version value.

If none of the above operational scenarios is satisfied, the MINIMUM_VERSION of the version range associated with the particular copy must be equal to the effective version value. The particular copy can therefore be updated to include the requested change since any node version splitting necessary for later versions has already been performed. The MAXIMUM_VERSION of the version range associated with the particular copy is set to the terminal version value.

After the change requested in the modification request is processed in the above manner, the version accumulator structure is checked to determine whether the effective version value is already stored therein. If it is not, the version accumulator structure is updated to store the effective version value.

According the copy-on-write techniques described herein, making a deep copy of a data object would be equivalent to modifying all of the nodes of the data object as of the same effective version at the same time. Thus, making a deep copy of the data object may be regarded as a special case that is transparently supported by the techniques described herein, including the retrieval techniques described hereinafter. It is also noted that in the simple case where edits are being made to the latest version of the data object, performing the modification techniques described herein would be equivalent to a simple in-place change to the latest (or current) version of the data object.

Figure 5:
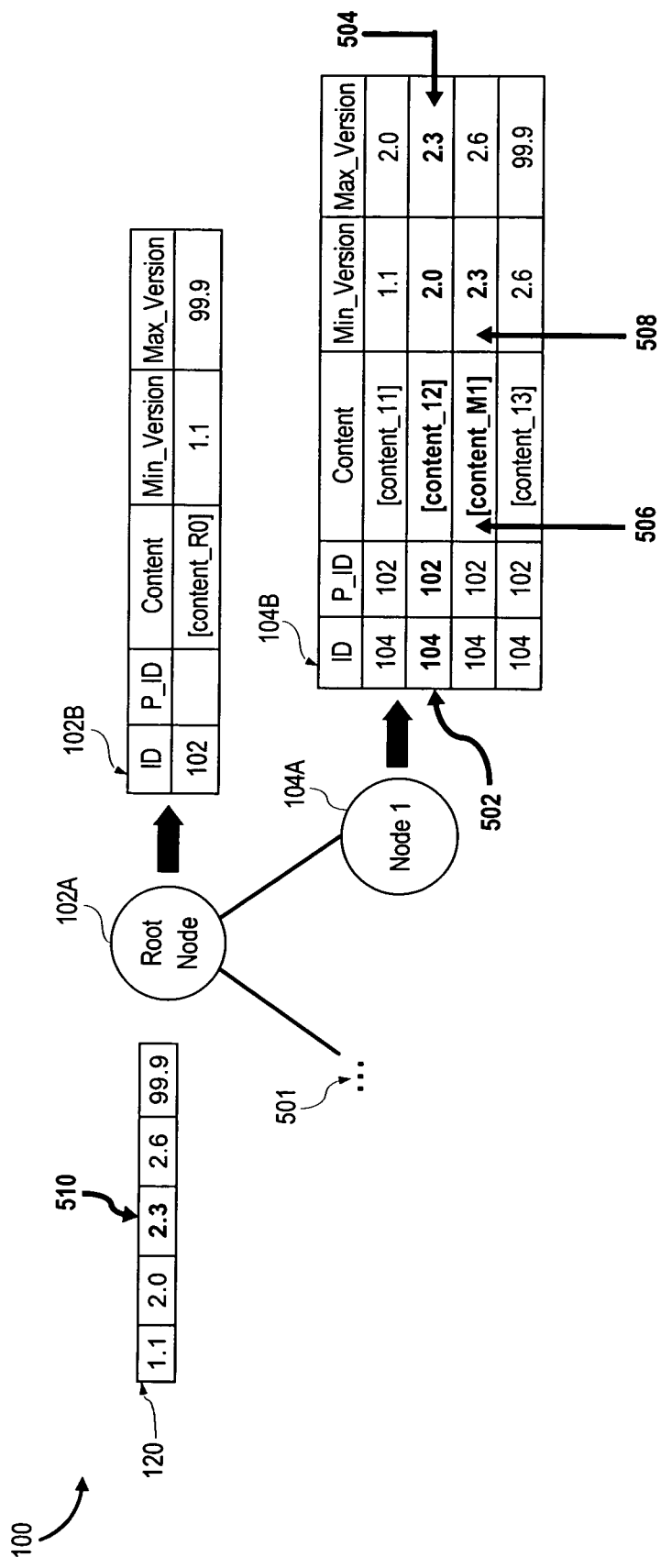
FIG. 5 is a block diagram that illustrates retroactively modifying a non-current version of a node in a data object according to one embodiment.

FIG. 5 is a block diagram that illustrates retroactively modifying a non-current version of a node in a data object according to one embodiment. FIG. 5 illustrates an operational scenario in which a node of data object 100 of FIG. 1 is modified, where the minimum version value of the copy of the node that needs to be modified is less than the effective version value specified in the modification request. (Ellipsis 501 indicates portions of data object 100 that are not shown in FIG. 5.)

In the operational scenario of FIG. 5, a request is received to change the content of node 104A to "[content_M1]" effective as of version "2.3". The effective version value "2.3" included in the modification request is compared to the version values stored in version accumulator structure 120, and a determination is made that the terminal version value associated with the modification request is version value "2.6". The particular copy of node 104A that needs to be removed is determined next. The effective version value "2.3" is compared to the version ranges associated with the copies of node 104A that are stored as records in storage structure 104B. Based on the version values stored in the "Min_Version" and "Max_Version" columns, the particular copy that needs to receive the requested change is determined as the record that stores the version value "2.0" in column "Min_Version". (It is noted that the current copy of node 104A is the record that stored the version value "2.6" in the "Min_Version" column; in other words, the received modification request specifies a change to an older version of node 104A.)

Since the minimum version value "2.0" of the particular copy that needs to receive the change is less than the effective version value "2.3", the particular copy of node 104A is stored as a new copy of the node as indicated by reference numeral 502. The minimum version value of the new copy is the same as the minimum version value of the original particular copy (e.g. version value "2.0"). The maximum version value of the new copy is set to the effective version value of "2.3" as indicated by reference numeral 504. The original particular copy is then updated to include the requested change (i.e. the content of the original particular node is updated to "[content_M1]") as indicated by reference numeral 506. The minimum version value of the original particular copy is then updated to the effective version value "2.3" as indicated by reference numeral 508. In this way, the particular copy is version-split into two separate copies, where the first copy stores the original content of the particular copy ("[content_12]"), and the second copy stores the changed content ("[content_M1]"). Version accumulator structure 120 is then checked to determine whether the effective version value "2.3" is stored therein. Since version value "2.3" is not stored in version accumulator structure 120, the version accumulator structure is updated to store the effective version value "2.3" as indicated by reference numeral 510.

Moving a Node Within a Versioned Data Object

The manner in which a node is moved within a versioned data object may depend on the logical representation of the data object. In different embodiments, moving a node within an object may be represented as some combination of one or more of the disclosed addition, removal, and/or modification operations. In addition, in different embodiments the move of a node to a different location in the data object may or may not be versioned - that is, the move may or may not be considered a change that would result in a new version of the data object. In embodiments in which a node move is versioned, moving a node to a different location within the data object may include modifying one or more nodes (e.g. the node being moved) as described in a previous section of this disclosure.

In one embodiment, the nodes in a data object may be organized according to a logical representation that is a tree in which child nodes store (or otherwise maintain) pointers to their corresponding parent nodes. This logical representation may be used for data objects that are single-parented, for example, XML documents and Microsoft® Office documents.

In this embodiment, moving a particular node to a different parent node within the data object may be performed by adding the node to the different parent node as described in a previous section of this disclosure. Moving the particular node to the different parent node would not require modifying the old or new parent nodes. In addition, moving the particular node to the different parent node may require modifying the particular node to properly reference (through a pointer) the different parent node as its new parent node, where the modification to the particular node may or may not be versioned depending on the particular implementation (e.g. the modification may or may not result in creating a new version of the data object).

Figure 6:
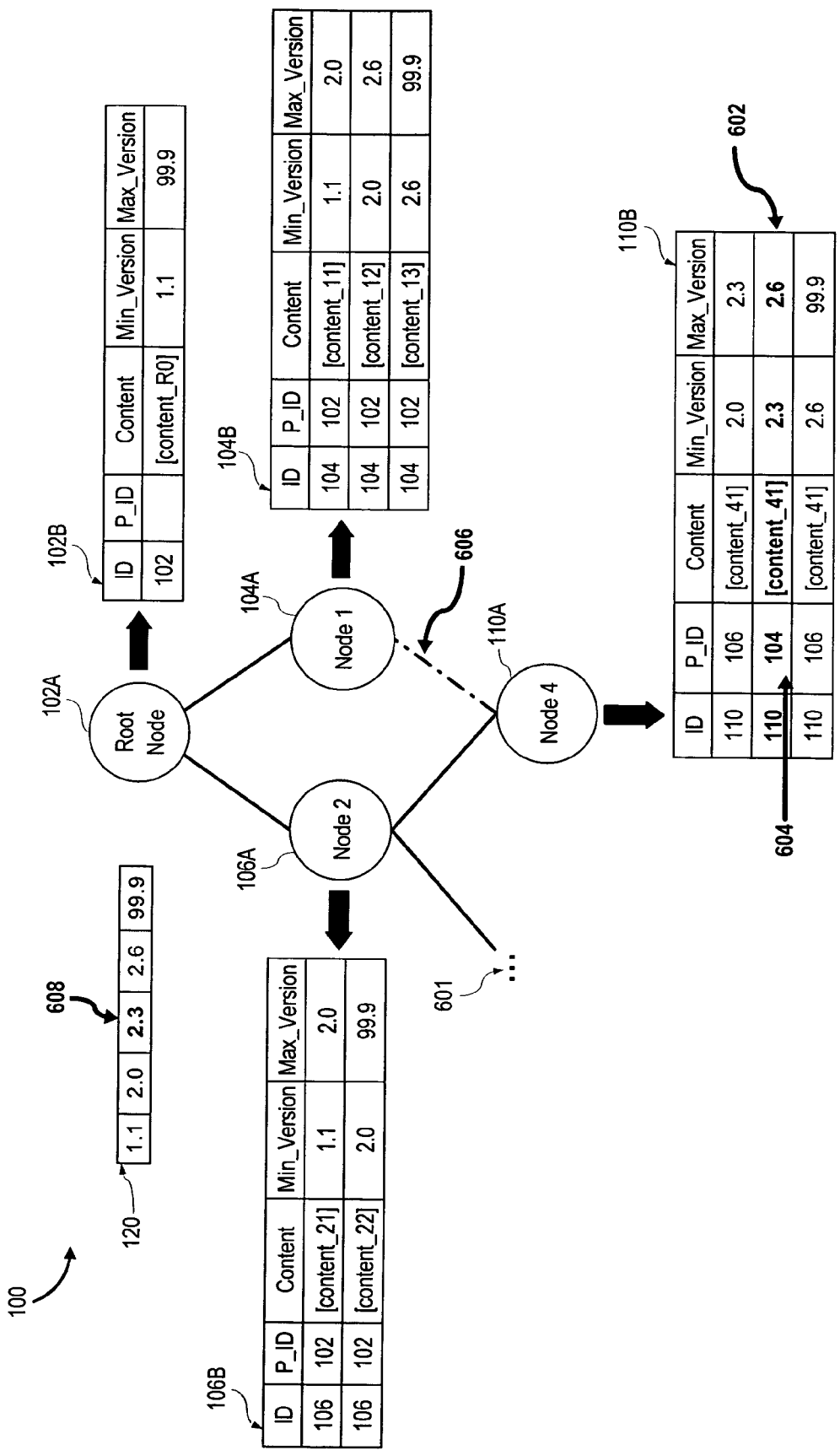
FIG. 6 is a block diagram that illustrates moving a node to a different location in a data object according to one embodiment.

FIG. 6 is a block diagram that illustrates a versioned move of a node to a different location in a data object according to one embodiment. FIG. 6 illustrates an operational scenario in which node 110A of data object 100 of FIG. 1 is moved and made a child node of node 104A. (Ellipsis 601 indicates portions of data object 100 that are not shown in FIG. 6.)

In the operational scenario of FIG. 6, a move request is received to make node 110A a child node of node 104A effective as of version "2.3". The nodes in data object 100 are organized in a logical representation that is a tree in which child nodes store pointers to their corresponding parent nodes. The pointers to the parent nodes are stored as parent identifiers in column "P_ID" of the records in the corresponding storage structures that store the nodes of data object 100. Thus, making node 110A a child of node 104A may be considered as a modification operation to change the parent pointer stored in a copy of node 110A, where the modification operation may be performed as described in a previous section of this disclosure.

For example, after the move request in the operational scenario of FIG. 6 is received, the effective version value specified therein (version value "2.3") is compared to the version values stored in version accumulator structure 120. A determination is made that the terminal version value associated with the move request is version value "2.6". The effective version value "2.3" is then compared to the version ranges associated with the copies of node 110A that are stored as records in storage structure 110B. Based on the comparison, a determination is made that the single copy of node 110A stored in storage structure 110B needs to be split and a new copy of node 110A needs to be stored as a new record in order to reflect a child relationship to node 104A. The single copy of node 110A is split into two separate copies that are both children of node 106A, where the first copy is effective as of version "2.3" up to version "2.3" (the effective version value specified in the move request) and the second copy is effective as of version "2.6" (the terminal version value associated with the move request) up to the infinity version value "99.9". A new copy of node 110B is then generated and stored as a record in storage structure 110B as indicated by reference numeral 602. The parent identifier stored in column "P_ID" of this new copy is set to "104" as indicated by reference numeral 604, thus indicating that the new copy is a child of node 104A as indicated by reference numeral 606. The minimum version value of the new copy is set to the effective version value "2.3" and the maximum version value of the new copy is set to the terminal version value "2.6". Version accumulator structure 120 is then checked to determine whether the effective version value "2.3" is stored therein. Since version value "2.3" is not stored in version accumulator structure 120, the version accumulator structure is updated to store the effective version value "2.3" as indicated by reference numeral 608.

In different implementations of this embodiment, modifying the parent pointer stored in a child node may be versioned. For example, suppose that a data object stores an employee hierarchy, and that the employee hierarchy needs to preserve a historical trail of which employees reported to which managers during which time periods. In this example, moving a particular node to a different parent in the data object may reflect a change in the employee hierarchy in which an existing employee begins to report to a different manager at a certain date. (It is noted that in this example, the version values for the data object would be drawn from the domain of datetime values, e.g. the version values would be dates.) In order to facilitate moving the particular node to the new parent node in this example, the particular node is modified where the change would be to set the particular node's parent pointer to the node identifier of the new parent node with the effective version value of the change being the certain date on which the change becomes effective. In other words, the parent pointer in a child node may be treated as part of the content of the child node; thus, any changes to the parent pointer in copies of the child node may be versioned according to the techniques described herein.

In one embodiment, the nodes in a data object may be organized according to a logical representation that is a tree in which parent nodes store a list of pointers to their corresponding child nodes. This logical representation may be used for data objects that are multi-parented (e.g. data objects that have multiple root nodes).

In this embodiment, moving a node to a different location in the data object would effectively include performing changes to two distinct nodes, one change to the old parent node, and one change to the new parent node. In addition, in this embodiment adding or removing a node may require some additional operations to maintain the integrity of the storage structures in which the nodes of the object are stored since additions, removals, and modifications may affect more than one node.

In one embodiment, the nodes in a data object may be organized according to a logical representation that is a directed graph. A directed graph may be considered as a collection of nodes with edges pointing from node to node. In one logical representation of a graph, a target node may maintain a list of pointers to its antecedent nodes; in another logical representation of a graph, a source node may maintain a list of pointers to its descendent nodes. The copy-on-write versioning techniques described herein are equally applicable to both of these logical representations of data objects.

In one embodiment, the nodes in a data object may be organized according to a logical representation in which links between the nodes are maintained as distinct components of the data object. The copy-on-write versioning techniques described herein are equally applicable to this logical representation of data objects, where moving a node to a different location may be represented as some sequence of addition, removal, and modification operations.

Retrieving Versions of a Data Object

The techniques described herein provide for maintaining fine-grained and ranged versions of data object nodes in storage structures that are suitable for on-the-fly reconstruction and retrieval of virtual versions of the data object. (As used herein, a "virtual" version refers to a version of a data object that would have been stored if a deep copy of the object were made to version the data object.) For example, in some embodiments, a request may be received which includes a certain version value that indicates a certain version of a data object that is to be retrieved. In response to the request, each node included in the data object may be traversed. At each visited node, a particular copy of that node that supports the certain version is determined. The particular copy is associated with a particular version range, where the certain version value specified in the request is greater than or equal to the minimum version value and less than the maximum version value of the particular version range.

In some embodiments, the nodes in a data object may be organized according to a logical representation that is a tree. In these embodiments, the following types of retrievals may be implemented to retrieve a requested version of the data object:

Downward traversal. This type of retrieval involves expanding the tree by traversing downward from parent nodes to their corresponding child nodes.

Upward traversal. This type of retrieval involves tracing the ancestry of a node by traversing upward from child nodes to their corresponding parent nodes.

Flattening traversal. This type of retrieval involves exploding the ancestry for all versions of all nodes of the data object into a tabular structure.

Downward Traversals

In one embodiment, downward traversal may be implemented as follows. For a desired version of the data object, each level of the tree representing the data object may be queried with the following filtering condition:

```
MINIMUM_VERSION <= [desired version]
AND MAXIMUM_VERSION > [desired version]
```

If a child-stores-pointer-to-parent structure is used to maintain the logical representation of the data object, each level of the traversal may include the following filtering condition:

```
PARENT_POINTER = [previous node visited in the descent]
AND MINIMUM_VERSION <= [desired version]
AND MAXIMUM_VERSION > [desired version]
```

In this embodiment, performing the downward traversal does not necessarily require an index; however, retrieval performance may be improved by creating one or more indexes. For example, to support downward traversal in this embodiment, an index may be created over the following three components in the specified order:

PARENT_POINTER, MAXIMUM_VERSION, MINIMUM_VERSION

The index may also be created with the MAXIMUM_VERSION component first in order to account for the asymmetry of minimum and maximum version values caused by the presence of infinity version values and the presumed preponderance of operations against the latest version of the data object.

In this embodiment, a downward traversal may be viewed as taking a slice directly through the tree representing the data object by using a desired version value in a range filtering condition. If the objective is simply to retrieve all components of the tree without sorting them into a hierarchy, a flat query against the index with just the version range condition may suffice.

Upward Traversals

In one embodiment, upward traversal may be implemented as follows. For a desired version of the data object, each level of the tree representing the data object may be queried with the following filtering condition:

```
NODE_IDENTITY = [parent of previous node visited in the ancestry]
AND MINIMUM_VERSION <= [desired version]
AND MAXIMUM_VERSION > [desired version]
```

In this embodiment, performing the upward traversal does not necessarily require an index; however, retrieval performance may be improved by creating one or more indexes. For example, to support upward traversal in this embodiment, an index may be created over the following three components in the specified order:

NODE_IDENTITY, MAXIMUM_VERSION, MINIMUM_VERSION

In this embodiment, upward traversal may be viewed as taking slice through the tree representing the data object in the upward (from the leaves to the root) direction. You can see that this is symmetric with downward traversal, although in the case of a tree we expect only one matching node per level upward.

The downward and upward traversals described herein would be applicable in the same manner to a data object that is organized according to a logical representation that is a graph.

Flattening Traversals

A "flattening" traversal is a technique for retrieving a flattened version of a data object or a portion thereof. For each copy of a parent node in the data object, the retrieval would determine on the fly, and output in a tabular structure, the copies of all child nodes that are descendants of that particular copy of the parent node.

FIG. 7 is a block diagram that illustrates a flattened version of a data object according to one embodiment. Table 702 illustrates a flattened version of the data object 100 that is depicted in FIG. 1.

In some embodiments, it may be desirable to flatten a data object that is logically represented by a tree by determining on the fly and outputting all nodes that are descendants of a particular node. For example, consider a data object that stores an employee hierarchy. In this example, it may be desirable to determine all employees that are underneath (e.g. report to) any of the managers in the employee hierarchy.

In some embodiments, a flattening traversal would make use of a search similar to that used for upward traversals. For each node in a tree representing a data object, an upward traversal may be performed to locate all ancestor nodes. A flattening traversal of a range-versioned tree, however, may be more complex than the flattening of a regular tree. This is because, while a tree normally has only one parent for each node, split processing of a parent node may give rise to situations where the parent node has child nodes that span ranges covered by multiple copies of the parent node, and vice-versa. In order to account for this operational scenario, the techniques described herein provide for flattening traversals that perform virtual, on-the-fly node-split processing as a tree representing a data object is flattened.

Some embodiments may provide flattening traversals that are based on downward traversals of a data object tree, while other embodiments may provide flattening traversals that are based on upward traversals of the tree.

In one embodiment, a flattening downward traversal may be implemented as follows. The traversal establishes lower and upper version bounds representing a "clipping window", where the lower and upper version bounds are initially set to the minimum and maximum version values of a version range associated with a particular copy of a parent node. A traversal query is executed to determine all child nodes that overlap the current clipping window, where the query includes the following filtering condition:

```
PARENT_POINTER = [parent node being examined]
AND MINIMUM_VERSION < [highest version of clipping window]
AND MAXIMUM_VERSION > [lowest version of clipping window]
```

If only a portion of the tree representing the data object needs to flattened, then the initial lower and upper version values may be established based on version values associated with the copies of a node that is different than the root node of the data object.

To flatten the entire data object, the flattening traversal starts by setting the lower bound of the clipping window to the lowest version value known (per the version accumulator structure) and the upper bound to the infinity version value, and then querying for all copies of all root nodes of the tree representing the data object. At each level of the tree (including the initial level), each node produced by the query is processed recursively in a depth-first fashion. As the traversal descends to a node, the previous bounds of the clipping window are saved (e.g. pushed on a stack), and new lower and upper bounds are determined based on the minimum and maximum version values of the child node currently being explored, in the following manner:

```
new LOWEST_VERSION   = max(previous  LOWEST_VERSION,
                           node      MINIMUM_VERSION)
new HIGHEST_VERSION  = min(previous  HIGHEST_VERSION,
                           node      MAXIMUM_VERSION)
```

The current node's children (if any) are then explored. After a node's children have been explored, or if a node has no children, the traversal can then output a flattening of the path that reached the current node. The output includes a list of copies of all nodes on the path in ancestry combination. Thus, if a path were taken from node "A" to node "B" to node "C" to node "D", the output would be:

(A, D) (B, D) (C, D) (D, D)

Each combination of nodes is associated in the output with a version range. The MINIMUM_VERSION of the version range of the combination is set to the LOWEST_VERSION of the clipping window, and the MAXIMUM_VERSION of the version range is set to the HIGHEST_VERSION of the clipping window. If the LOWEST_VERSION and HIGHEST_VERSION of the clipping window are identical, the output of this combination may be suppressed. Once the current node is processed in this manner, the previous state of the clipping window is restored (e.g. popped from the stack), and the traversal proceeds to the next sibling node. The traversal ends when no further nodes remain to be examined.

In some embodiments, the flattening downward traversal may produce more entries than are strictly needed to cover the flattening of a data object. This is because the traversal would perform a worst-case virtual split of every node based on the pathways the node is involved in. In these embodiments, the output of the flattening traversal may be post-processed to find and merge any unnecessary splits.

In one embodiment, a flattening upward traversal may be implemented as follows. (In this embodiment, any removals of nodes are cascaded downward so that there would be no orphaned copies of nodes in the data object tree.) Similarly to the flattening downward traversal, this traversal also performs on-the-fly split processing, and does not produce unnecessary splits.

In this embodiment, each node in the tree is used as a "starting node" for an ancestor search. The search is done by doing an upward traversal that is "clipped" by the maximum and minimum version of the starting node, according to the following filtering condition:

```
NODE_IDENTITY = [parent of previous node visited in the ancestry]
AND MINIMUM_VERSION <  [MAXIMUM_VERSION of starting
node]
AND MAXIMUM_VERSION >  [MINIMUM_VERSION of starting
node]
```

The traversal uses the version range spanned by the minimum and maximum version values of a copy of the starting node, and works up the ancestry, excluding any copy of an ancestor node that is completely outside the version range, but including any copy of the ancestor node that overlaps the version range on either side. The version ranges of the found ancestor node copies are then "trimmed" according to the following logic:

```
virtual               max(ancestor node MINIMUM_VERSION,
MINIMUM_VERSION =     starting node MINIMUM_VERSION)
virtual               min(ancestor node MAXIMUM_VERSION,
MAXIMUM_VERSION =     starting node MAXIMUM_VERSION)
```

This logic ensures that the list of ancestor relationships produced by the query still conforms to the version split processing described in previous section of this disclosure. Copies of ancestors that straddle the upper or lower bound of the starting child node are trimmed off to conform to these bounds.

Hardware Overview

Figure 8:
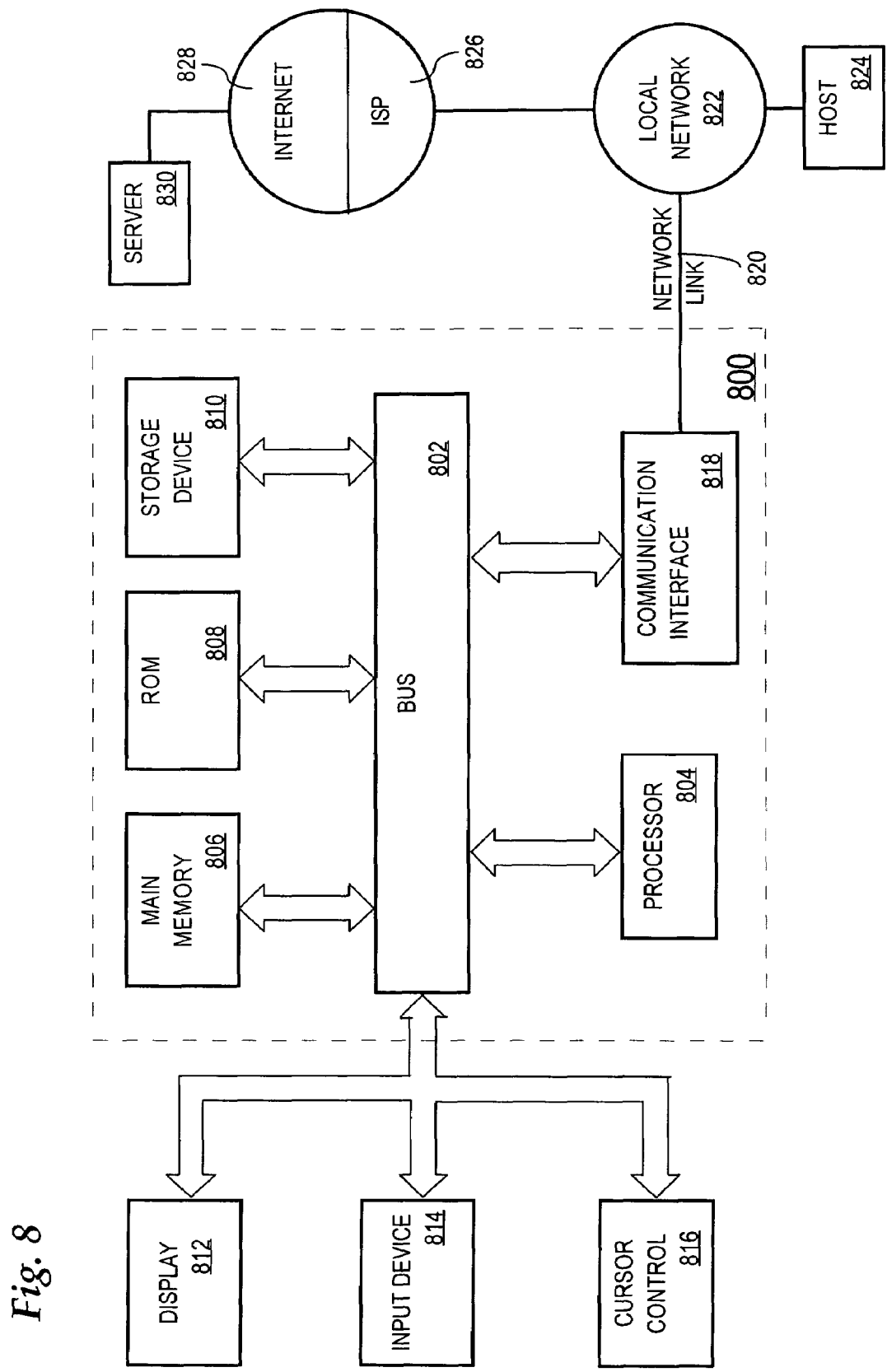
FIG. 8 is a block diagram that illustrates a computer system upon which an embodiment may be implemented.

FIG. 8 is a block diagram that illustrates a computer system 800 upon which an embodiment of the techniques for copy-on-write versioning of documents may be implemented. Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

The invention is related to the use of computer system 800 for implementing the techniques for copy-on-write versioning of documents described herein. According to one embodiment, those techniques are performed by computer system 800 in response to processor 804 executing one or more sequences of one or more instructions contained in main memory 806. Such instructions may be read into main memory 806 from another machine-readable medium, such as storage device 810. Execution of the sequences of instructions contained in main memory 806 causes processor 804 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 800, various machine-readable media are involved, for example, in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution. In this manner, computer system 800 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method for versioning of data objects comprising:

storing one or more version values in a version accumulator structure, wherein each of the one or more version values indicates a different version of a data object;

wherein the data object includes, and is decomposable into, a plurality of nodes;

storing one or more copies of each node of the plurality of nodes, wherein each copy of the one or more copies is associated with a version range which does not overlap with any other version range that is associated with any other copy of the one or more copies;

receiving a first request to perform a change to the data object, wherein the change involves a particular node of the plurality of nodes, and wherein the first request specifies an effective version value for the change;

performing the change to the data object, wherein performing the change does not include making a complete copy of the data object that reflects the change, and wherein performing the change comprises:

inspecting the version accumulator structure to determine a terminal version value, wherein the terminal version value is the smallest version value stored in the version accumulator structure that is greater than the effective version value specified in the first request; and performing the change based at least on the effective version value and the terminal version value;

wherein performing the change to the data object further comprises adding the particular node to the plurality of nodes included in the data object, wherein adding the particular node to the plurality of nodes comprises:

storing a copy of the particular node, wherein the copy of the particular node is associated with a particular version range, wherein a minimum version value included in the particular version range is set to the effective version value, and wherein a maximum version value included the particular version range is set to the terminal version value; and if the effective version value is not already stored in the version accumulator structure, then storing the effective version value in the version accumulator structure;

receiving a second request to retrieve a certain version of the data object; and retrieving the certain version of the data object based on version ranges associated with the one or more copies of each node of the plurality of nodes;

wherein the method is performed by one or more computing devices.

2. The method of claim 1, wherein the plurality of nodes included in the data object are organized in a hierarchical tree.

3. The method of claim 1, wherein the one or more copies of each node of the plurality of nodes included in the data object are stored in one or more relational tables of one or more relational databases.

4. The method of claim 1, wherein:
the version range associated with any of the one or more copies of any node of the plurality of nodes includes a minimum version value and a maximum version value;
the one or more copies of each node of the plurality of nodes are stored in one or more storage structures; and
the method further comprises creating and maintaining at least one index over the one or more storage structures, wherein the at least one index is based on at least one of minimum version values and maximum version values associated with copies of the plurality of nodes.

5. The method of claim 1, wherein the second request includes a certain version value that indicates the certain version specified in the second request, wherein the certain version value does not match any version value stored in the version accumulator structure.

6. The method of claim 1, wherein performing the change to the data object further comprises:
adding the particular node as a new node to the plurality of nodes included in the data object;
removing the particular node from the plurality of nodes included in the data object;
modifying the particular node of the plurality of nodes included in the data object;
moving the particular node of the plurality of nodes to a different location in the data object.

7. The method of claim 1, wherein performing the change to the data object further comprises removing the particular node from the plurality of nodes included in the data object, wherein removing the particular node from the plurality of nodes comprises:

determining a particular copy of the one or more copies of the particular node, wherein the particular copy is associated with a particular version range, wherein the effective version value is greater than or equal to the minimum version value included in the particular version range, and wherein the effective version value is less than the maximum version value included in the particular version range;

if the minimum version value is equal to the effective version value and the maximum version value is greater than the terminal version value, then setting the minimum version value to the terminal version value in the particular version range associated with the particular copy;

if the maximum version value is greater than the terminal version value, then storing the particular copy as a new copy of the particular node, wherein the new copy is associated with a new version range, wherein the new minimum version value included in the new version range is set to the terminal version value, and wherein the new maximum version value included the new version range is set to the maximum version value;

if the minimum version value is less than the effective version value, then setting the maximum version value to the effective version value in the particular version range associated with the particular copy;

if the minimum version value is equal to the effective version value and the maximum version value is equal to the terminal version value, then deleting the particular copy of the one or more copies of the particular node; and if the effective version value is not already stored in the version accumulator structure, then storing the effective version value in the version accumulator structure.

8. The method of claim 7, wherein:
the plurality of nodes included in the data object are organized in a hierarchical tree;
the particular node is a parent node of one or more descendant nodes in the hierarchical tree; and
removing the particular node further comprises:
recursively traversing the one or more descendant nodes; and
removing any copies of the one or more descendant nodes which are associated with version ranges that match the particular version range associated with the particular copy.

9. The method of claim 1, wherein performing the change to the data object further comprises modifying the particular node of the plurality of nodes included in the data object, wherein modifying the particular node of the plurality of nodes comprises:

determining a particular copy of the one or more copies of the particular node, wherein the particular copy is associated with a particular version range, wherein the effective version value is greater than or equal to the minimum version value included in the particular version range, and wherein the effective version value is less than the maximum version value included in the particular version range;

if the minimum version value is equal to the effective version value and the maximum version value is equal to the terminal version value, then updating the particular copy of the particular node to include the requested change;

if the maximum version value is greater than the terminal version value, then storing a new copy of the particular node that includes the requested change, wherein the new copy is associated with a new version range, wherein the new minimum version value included in the new version range is set to the terminal version value, and wherein the new maximum version value included the new version range is set to the maximum version value;

if the minimum version value is less than the effective version value, then:
  storing the particular copy as a new copy of the particular node, wherein the new copy is associated with a new version range, wherein the new minimum version value included in the new version range is set to the minimum version value, and wherein the new maximum version value included the new version range is set to the effective version value;
  updating the particular copy with the requested change; and
  setting the minimum version value included in the particular version range to the effective version value and setting the maximum version value included in the particular version range to the terminal version value; and if the effective version value is not already stored in the version accumulator structure, then storing the effective version value in the version accumulator structure.

10. The method of claim 1, wherein:

the plurality of nodes included in the data object are organized in a hierarchical tree;

the certain version specified in the second request is a flattened version of the data object; and retrieving the certain version of the data object further comprises traversing each node of the plurality of nodes, wherein traversing said each node comprises:
  recursively traversing each child node of said each node;
  for said each child node, determining a particular copy of the one or more copies of said each child node, wherein the particular copy is associated with a particular version range that overlaps a certain version range associated with a certain copy of said each node;
  determining a new version range for the particular copy of said each child node based on the particular version range and the certain version range;
  retrieving the particular copy of said each child node; and
  returning an output in response to the second request, wherein in the output the particular copy is associated with the new version range instead of the particular version range.

11. The method of claim 1, wherein:

the plurality of nodes included in the data object are organized in a hierarchical tree;

the certain version specified in the second request is a flattened version of the data object; and retrieving the certain version of the data object further comprises traversing each node of the plurality of nodes, wherein traversing said each node comprises:
  for each ancestor node of said each node in the hierarchical tree, determining a particular copy of the one or more copies of said each ancestor node, wherein the particular copy is associated with a particular version range that overlaps a certain version range associated with a certain copy of said each node;
  determining a new version range for the particular copy of said each ancestor node based on the particular version range and the certain version range;
  retrieving the particular copy of said each ancestor node; and
  returning an output in response to the second request, wherein in the output the particular copy is associated with the new version range instead of the particular version range.

12. A machine-readable volatile or non-volatile medium storing one or more sequences of instructions which, when executed by one or more processors, cause:
  storing one or more version values in a version accumulator structure, wherein each of the one or more version values indicates a different version of a data object;
  wherein the data object includes, and is decomposable into, a plurality of nodes;
  storing one or more copies of each node of the plurality of nodes, wherein each copy of the one or more copies is associated with a version range which does not overlap with any other version range that is associated with any other copy of the one or more copies;
  receiving a first request to perform a change to the data object, wherein the change involves a particular node of the plurality of nodes, and wherein the first request specifies an effective version value for the change;
  performing the change to the data object, wherein performing the change does not include making a complete copy of the data object that reflects the change, and wherein performing the change comprises:
    inspecting the version accumulator structure to determine a terminal version value, wherein the terminal version value is the smallest version value stored in the version accumulator structure that is greater than the effective version value specified in the first request; and
    performing the change based at least on the effective version value and the terminal version value;
  wherein performing the change to the data object further comprises adding the particular node to the plurality of nodes included in the data object, wherein adding the particular node to the plurality of nodes comprises:
    storing a copy of the particular node, wherein the copy of the particular node is associated with a particular version range, wherein a minimum version value included in the particular version range is set to the effective version value, and wherein a maximum version value included the particular version range is set to the terminal version value; and
    if the effective version value is not already stored in the version accumulator structure, then storing the effective version value in the version accumulator structure;
  receiving a second request to retrieve a certain version of the data object; and
  retrieving the certain version of the data object based on version ranges associated with the one or more copies of each node of the plurality of nodes.

13. The machine-readable medium of claim 12, wherein the version range associated with any of the one or more copies of any node of the plurality of nodes includes a minimum version value and a maximum version value.

14. The machine-readable medium of claim 13, wherein version values included in the version range are drawn from a domain of values that comprises any one of:
  datetime values;
  real number values; and
  an ordered set of values.

15. The machine-readable medium of claim 12, wherein the plurality of nodes included in the data object are not organized in any particular logical representation.

16. The machine-readable medium of claim 12, wherein the version accumulator structure is stored within a specific node of the plurality of nodes included in the data object.

17. The machine-readable medium of claim 12, wherein:
the effective version value specified in the first request indicates a non-current version of the data object; and
the change is performed relative to a non-current copy of the particular node of the plurality of nodes.

18. The machine-readable medium of claim 12, wherein:
the plurality of nodes included in the data object are organized in a hierarchical tree, wherein each child node in the hierarchical tree stores a pointer to a parent node; and
the instructions that cause performing the change to the data object further comprise instructions which, when executed by the one or more processors, cause moving the particular node of the plurality of nodes under a different parent node in the hierarchical tree.

19. The machine-readable medium of claim 12, wherein:
the plurality of nodes included in the data object are organized in a hierarchical tree, wherein each parent node in the hierarchical tree stores a list of pointers to one or more child nodes; and
the instructions that cause performing the change to the data object further comprise instructions which, when executed by the one or more processors, cause moving the particular node of the plurality of nodes under a different parent node in the hierarchical tree, wherein moving the particular node comprises modifying the different parent node.

20. The machine-readable medium of claim 12, wherein:
the second request includes a certain version value that indicates the certain version of the data object; and
the instructions that cause retrieving the certain version of the data object further comprise instructions which, when executed by the one or more processors, cause traversing each node of the plurality of nodes, wherein traversing said each node comprises:
determining a particular copy of the one or more copies of said each node, wherein the particular copy is associated with a particular version range, wherein the certain version value is greater than or equal to the minimum version value included in the particular version range, and wherein the certain version value is less than the maximum version value included in the particular version range; and
retrieving the particular copy of said each node.

21. The machine-readable medium of claim 20, wherein:
the plurality of nodes included in the data object are organized in a hierarchical tree; and
traversing said each node of the plurality of nodes further comprises traversing the hierarchical tree by descending downward from a parent node of the hierarchical tree to any child nodes thereof.

22. The machine-readable medium of claim 20, wherein:
the plurality of nodes included in the data object are organized in a hierarchical tree; and
traversing said each node of the plurality of nodes further comprises traversing the hierarchical tree by ascending upward from a child node of the hierarchical tree to any parent nodes thereof.

23. The machine-readable medium of claim 12, wherein the plurality of nodes included in the data object are organized in a hierarchical tree.

24. The machine-readable medium of claim 12, wherein the one or more copies of each node of the plurality of nodes included in the data object are stored in one or more relational tables of one or more relational databases.

25. The machine-readable medium of claim 12, wherein:
the version range associated with any of the one or more copies of any node of the plurality of nodes includes a minimum version value and a maximum version value;
the one or more copies of each node of the plurality of nodes are stored in one or more storage structures; and
the one or more sequences of instructions further comprise instructions which, when executed by the one or more processors, cause creating and maintaining at least one index over the one or more storage structures, wherein the at least one index is based on at least one of minimum version values and maximum version values associated with copies of the plurality of nodes.

26. The machine-readable medium of claim 12, wherein the second request includes a certain version value that indicates the certain version specified in the second request, wherein the certain version value does not match any version value stored in the version accumulator structure.

27. The machine-readable medium of claim 12, wherein the instructions that cause performing the change to the data object further comprise instructions which, when executed by the one or more processors, cause:
adding the particular node as a new node to the plurality of nodes included in the data object;
removing the particular node from the plurality of nodes included in the data object;
modifying the particular node of the plurality of nodes included in the data object;
moving the particular node of the plurality of nodes to a different location in the data object.

28. The machine-readable medium of claim 12, wherein the instructions that cause performing the change to the data object further comprise instructions which, when executed by the one or more processors, cause removing the particular node from the plurality of nodes included in the data object, wherein removing the particular node from the plurality of nodes comprises:
determining a particular copy of the one or more copies of the particular node, wherein the particular copy is associated with a particular version range, wherein the effective version value is greater than or equal to the minimum version value included in the particular version range, and wherein the effective version value is less than the maximum version value included in the particular version range;
if the minimum version value is equal to the effective version value and the maximum version value is greater than the terminal version value, then setting the minimum version value to the terminal version value in the particular version range associated with the particular copy;
if the maximum version value is greater than the terminal version value, then storing the particular copy as a new copy of the particular node, wherein the new copy is associated with a new version range, wherein the new minimum version value included in the new version range is set to the terminal version value, and wherein the new maximum version value included the new version range is set to the maximum version value;
if the minimum version value is less than the effective version value, then setting the maximum version value to the effective version value in the particular version range associated with the particular copy;

if the minimum version value is equal to the effective version value and the maximum version value is equal to the terminal version value, then deleting the particular copy of the one or more copies of the particular node; and if the effective version value is not already stored in the version accumulator structure, then storing the effective version value in the version accumulator structure.

29. The machine-readable medium of claim 28, wherein:

the plurality of nodes included in the data object are organized in a hierarchical tree;

the particular node is a parent node of one or more descendant nodes in the hierarchical tree; and removing the particular node from the plurality of nodes further comprises:
  recursively traversing the one or more descendant nodes; and
  removing any copies of the one or more descendant nodes which are associated with version ranges that match the particular version range associated with the particular copy.

30. The machine-readable medium of claim 12, wherein the instructions that cause performing the change to the data object further comprise instructions which, when executed by the one or more processors, cause modifying the particular node of the plurality of nodes included in the data object, wherein modifying the particular node of the plurality of nodes comprises:

determining a particular copy of the one or more copies of the particular node, wherein the particular copy is associated with a particular version range, wherein the effective version value is greater than or equal to the minimum version value included in the particular version range, and wherein the effective version value is less than the maximum version value included in the particular version range;

if the minimum version value is equal to the effective version value and the maximum version value is equal to the terminal version value, then updating the particular copy of the particular node to include the requested change;

if the maximum version value is greater than the terminal version value, then storing a new copy of the particular node that includes the requested change, wherein the new copy is associated with a new version range, wherein the new minimum version value included in the new version range is set to the terminal version value, and wherein the new maximum version value included the new version range is set to the maximum version value;

if the minimum version value is less than the effective version value, then:
  storing the particular copy as a new copy of the particular node, wherein the new copy is associated with a new version range, wherein the new minimum version value included in the new version range is set to the minimum version value, and wherein the new maximum version value included the new version range is set to the effective version value;
  updating the particular copy with the requested change; and setting the minimum version value included in the particular version range to the effective version value and setting the maximum version value included in the particular version range to the terminal version value; and if the effective version value is not already stored in the version accumulator structure, then storing the effective version value in the version accumulator structure.

31. The machine-readable medium of claim 12, wherein:

the plurality of nodes included in the data object are organized in a hierarchical tree;

the certain version specified in the second request is a flattened version of the data object; and the instructions that cause retrieving the certain version of the data object further comprise instructions which, when executed by the one or more processors, cause traversing each node of the plurality of nodes, wherein traversing said each node comprises:
  recursively traversing each child node of said each node;
  for said each child node, determining a particular copy of the one or more copies of said each child node, wherein the particular copy is associated with a particular version range that overlaps a certain version range associated with a certain copy of said each node;
  determining a new version range for the particular copy of said each child node based on the particular version range and the certain version range;
  retrieving the particular copy of said each child node; and
  returning an output in response to the second request, wherein in the output the particular copy is associated with the new version range instead of the particular version range.

32. The machine-readable medium of claim 12, wherein:

the plurality of nodes included in the data object are organized in a hierarchical tree;

the certain version specified in the second request is a flattened version of the data object; and the instructions that cause retrieving the certain version of the data object further comprise instructions which, when executed by the one or more processors, cause traversing each node of the plurality of nodes, wherein traversing said each node comprises:
  for each ancestor node of said each node in the hierarchical tree, determining a particular copy of the one or more copies of said each ancestor node, wherein the particular copy is associated with a particular version range that overlaps a certain version range associated with a certain copy of said each node;
  determining a new version range for the particular copy of said each ancestor node based on the particular version range and the certain version range;
  retrieving the particular copy of said each ancestor node; and
returning an output in response to the second request, wherein in the output the particular copy is associated with the new version range instead of the particular version range.

* * * * *

UNITED STATES PATENT AND TRADEMARK OFFICE
CERTIFICATE OF CORRECTION

PATENT NO.        : 7,627,615 B2                                                    Page 1 of 1
APPLICATION NO.   : 11/590430
DATED             : December 1, 2009
INVENTOR(S)       : Douglas James McMahon It is certified that error appears in the above-identified patent and that said Letters Patent is hereby corrected as shown below:

In column 1, line 22, delete "extensible" and insert -- eXtensible --, therefor.

In column 3, line 23, delete "Sturctural" and insert -- Structural --, therefor.

In column 3, line 45, delete "the." and insert -- the --, therefor.

In column 6, line 16, delete "102A ." and insert -- 102A. --, therefor.

In column 7, line 25, after "Retrieving" insert -- Versions --.

In column 15, line 2, delete "MNIMUM_VERSION" and insert -- MINIMUM_VERSION --, therefor.

In column 17, line 35, delete ""2.3"" and insert -- "2.0" --, therefor.

In column 25, line 24, in claim 1, delete "structure:" and insert -- structure; --, therefor.

In column 26, line 24, in claim 7, after "included" insert -- in --.

In column 27, lines 7-8, in claim 9, after "included" insert -- in --.

In column 27, line 17, in claim 9, after "included" insert -- in --.

In column 30, line 62, in claim 28, after "included" insert -- in --.

In column 31, lines 48-49, in claim 30, after "included" insert -- in --.

In column 31, line 58, in claim 30, after "included" insert -- in --.

Signed and Sealed this

Twenty-eighth Day of September, 2010

David J. Kappos
*Director of the United States Patent and Trademark Office*